US012398733B2

(12) United States Patent
Miller et al.

(10) Patent No.: US 12,398,733 B2
(45) Date of Patent: Aug. 26, 2025

(54) WATER COOLED PUMP AND HEAT TRANSFER SYSTEM

(71) Applicant: Pentair Water Pool and Spa, Inc., Cary, NC (US)

(72) Inventors: James Miller, Sanford, NC (US); Robert W. Stiles, Jr., San Marcos, CA (US); Thomas Safon, Holly Springs, NC (US); Ronald B. Robol, Savannah, GA (US); Everett Cox, Sanford, NC (US)

(73) Assignee: Pentair Water Pool and Spa, Inc., Cary, NC (US)

(*) Notice: Subject to any disclaimer, the term of this patent is extended or adjusted under 35 U.S.C. 154(b) by 245 days.

(21) Appl. No.: 16/827,114

(22) Filed: Mar. 23, 2020

(65) Prior Publication Data

US 2020/0309153 A1 Oct. 1, 2020

Related U.S. Application Data

(60) Provisional application No. 62/823,434, filed on Mar. 25, 2019.

(51) Int. Cl.

*F04D 29/58* (2006.01)
*E04H 4/12* (2006.01)
*F04D 13/06* (2006.01)

(52) U.S. Cl.

CPC ......... *F04D 29/5806* (2013.01); *F04D 13/06* (2013.01); *F04D 29/5893* (2013.01); *E04H 4/1245* (2013.01); *F05B 2260/2241* (2013.01)

(58) Field of Classification Search

CPC .................. F05B 2260/2241; F05B 2260/208
See application file for complete search history.

(56) References Cited

U.S. PATENT DOCUMENTS 2,777,961 A * 1/1957 Penlington ........... H02K 5/1285 310/86
4,685,867 A * 8/1987 Patun .................. F04D 29/5893 310/87
4,930,996 A * 6/1990 Jensen .................... F04D 13/10 417/373
5,178,523 A * 1/1993 Cheng-Chung ........ B01D 29/92 415/168.2

(Continued)

FOREIGN PATENT DOCUMENTS

CN 206600277 U 10/2017
DE 3642727 A1 6/1988

(Continued)

OTHER PUBLICATIONS

JP2004218460machinetranslation, Espacenet.com, Aug. 17, 2023. (Year: 2004).*

(Continued)

*Primary Examiner* — Bryan M Lettman
(74) *Attorney, Agent, or Firm* — Husch Blackwell LLP

(57) ABSTRACT

A pump system for pumping water for pools or other flow systems including a pump, a motor, an electronic assembly, and a cooling system. The cooling system provides heat transfer from the pump system to the process flow. The cooling system includes a heat-pipe arrangement designed to transfer heat to one or more heat sinks.

20 Claims, 7 Drawing Sheets

(56) References Cited

U.S. PATENT DOCUMENTS

| | | | | | |
|---|---|---|---|---|---|
| 5,332,369 | A * | 7/1994 | Jensen | F04D 29/5806 417/369 |
| 6,644,938 | B2 * | 11/2003 | Omori | F16C 37/005 417/423.4 |
| 7,928,348 | B2 * | 4/2011 | Neal | H05B 6/108 219/628 |
| 8,540,497 | B2 * | 9/2013 | Chang | F04D 25/0646 310/64 |
| 9,732,765 | B2 * | 8/2017 | Surowinski | H02K 11/33 |
| 2015/0361991 | A1 * | 12/2015 | Surowinski | H02K 11/33 415/175 |

FOREIGN PATENT DOCUMENTS

| | | | | |
|---|---|---|---|---|
| JP | 2004218460 | * | 8/2004 | F04D 13/08 |
| JP | 2004218460 A | | 8/2004 | |

OTHER PUBLICATIONS

"Swimming pool pumps E.SWIM", DAB Water Technology, published before Mar. 23, 2020, accessed on Mar. 23, 2020, 4 pages, <URL: https://dabpumps.us/en/node/720>.

"Silensor Pro", Davey, published before Mar. 23, 2020, accessed on Mar. 23, 2020, 3 pages, <https://www.daveywater.com/us/product/silensorpro-us>.

Office Action issued for French Patent Application No. 2002901 dated Mar. 18, 2022.

* cited by examiner

WATER COOLED PUMP AND HEAT TRANSFER SYSTEM

RELATED APPLICATIONS

This application claims priority to U.S. Provisional Application No. 62/823,434, filed on Mar. 25, 2019, the entire disclosure of which is incorporated herein by reference.

BACKGROUND

Pump motors and pump motor controls generate waste heat energy while operating. A number of methods have been developed to remove the excess heat energy and prevent the pump motor and motor controls from overheating. For example, a forced convection fan can be provided to drive air over the motor, motor casing, and the motor controls. Heat sinks may be used in combination with the forced convection fan to more efficiently concentrate thermal energy for dissipation. Pumps can also be configured with a wet rotor, where the fluid (e.g. water) being pumped surrounds the rotor during operation. A thermally conductive shell positioned in between the rotor and the stator, can also be included in a wet rotor pump to improve the efficiency of heat dissipation.

SUMMARY

While the use of a convection fan can successfully dissipate heat in some applications, water and other liquids can have a larger thermal capacity than air and can accordingly be more effective mediums for removing heat energy from a motor or drive heatsink. However, wet rotor configurations may not be ideal in some applications, including those with process water having debris or other contaminants that can clog or otherwise adversely affect the rotor. For example, wet rotors may not be ideal for use in a pump system for swimming pools. Thus, it can be helpful to provide a structure for cooling pumps that uses a fluid, such as water, for dissipating heat from one or more pump components, while ensuring that the pump and any cooling circuit are not adversely affected by the fluid.

Some embodiments of the invention provide a pump system for pumping water for pools or other flow systems. The pump system can include a pump, a motor configured to operate the pump, an electronic assembly configured to control the motor, and a cooling system. The cooling system can include a heat sink in thermal communication with the water and a heat-pipe arrangement that includes at least one heat pipe configured to transfer heat between the heat sink and at least one of the motor or the electronic assembly. In some forms, the heat sink is configured to be at least partly immersed in the water during operation of the pump. The heat sink can be arranged on an end plate of the pump and/or can be arranged downstream of an impeller of the pump. The heat sink can be arranged on an outlet pipe of the pump system. The heat sink can be part of a plurality of heat sinks, each in thermal communication with the water and the heat-pipe arrangement.

In some forms, the at least one heat pipe includes a parallel arrangement of multiple heat pipes configured for parallel transfer of heat from the electronic assembly and the motor. The at least one heat pipe can include a series arrangement of multiple heat pipes configured for series transfer of heat from the electronic assembly and the motor. The at least one heat pipe can include at least a first heat pipe in parallel with a second heat pipe, and a third heat pipe in series with the first and second heat pipes.

In some forms, the heat-pipe arrangement further includes an intermediate heat transfer plate. The at least one heat pipe can further include a first heat pipe configured to transfer heat to the intermediate heat transfer plate from the at least one of the motor or the electronic assembly, and a second heat pipe configured to transfer heat from the intermediate heat transfer plate to the heat sink. The electronic assembly can be secured to the motor via the intermediate heat transfer plate. The first heat pipe can be configured to transfer heat from the motor to the intermediate heat transfer plate, and the at least one heat pipe can further include a third heat pipe configured to transfer heat from the electronic assembly to the intermediate heat transfer plate. The intermediate heat transfer plate can be arranged to directly receive heat conductively from a pole of a stator of the motor. The first heat pipe can be secured with a clamp plate to a pole of a stator of the motor.

Some embodiments of the invention provide a cooling system for a pump system that is configured to pump water for pools or other flow systems, the pump system including a pump, a motor configured to operate the pump, and an electronic assembly configured to control the motor. The cooling system can include a heat sink in thermal communication with the water and a heat-pipe arrangement that includes at least one heat pipe configured to transfer heat between the heat sink and the at least one of the motor or the electronic assembly.

In some forms, the heat sink is configured to be exposed to flow of the water during operation of the pump. The heat sink can be arranged in at least one of a window of an end plate of the pump, downstream of an impeller of the pump, or an outlet pipe of the pump system. The at least one heat pipe can include one or more of a parallel arrangement of multiple heat pipes configured for parallel transfer of heat from the electronic assembly and the motor, or a series arrangement of multiple heat pipes configured for series transfer of heat from the electronic assembly and the motor. The heat-pipe arrangement can further include an intermediate heat transfer plate. The at least one heat pipe can further include a first heat pipe configured to transfer heat to the intermediate heat transfer plate from the at least one of the motor or the electronic assembly and a second heat pipe configured to transfer heat from the intermediate heat transfer plate to the heat sink. The intermediate heat transfer plate can be arranged to directly receive heat conductively from a first pole of a stator of the motor, and the heat-pipe arrangement can be configured to transfer heat to the intermediate heat transfer plate from one or more of a second pole of the stator or a third pole of the stator.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
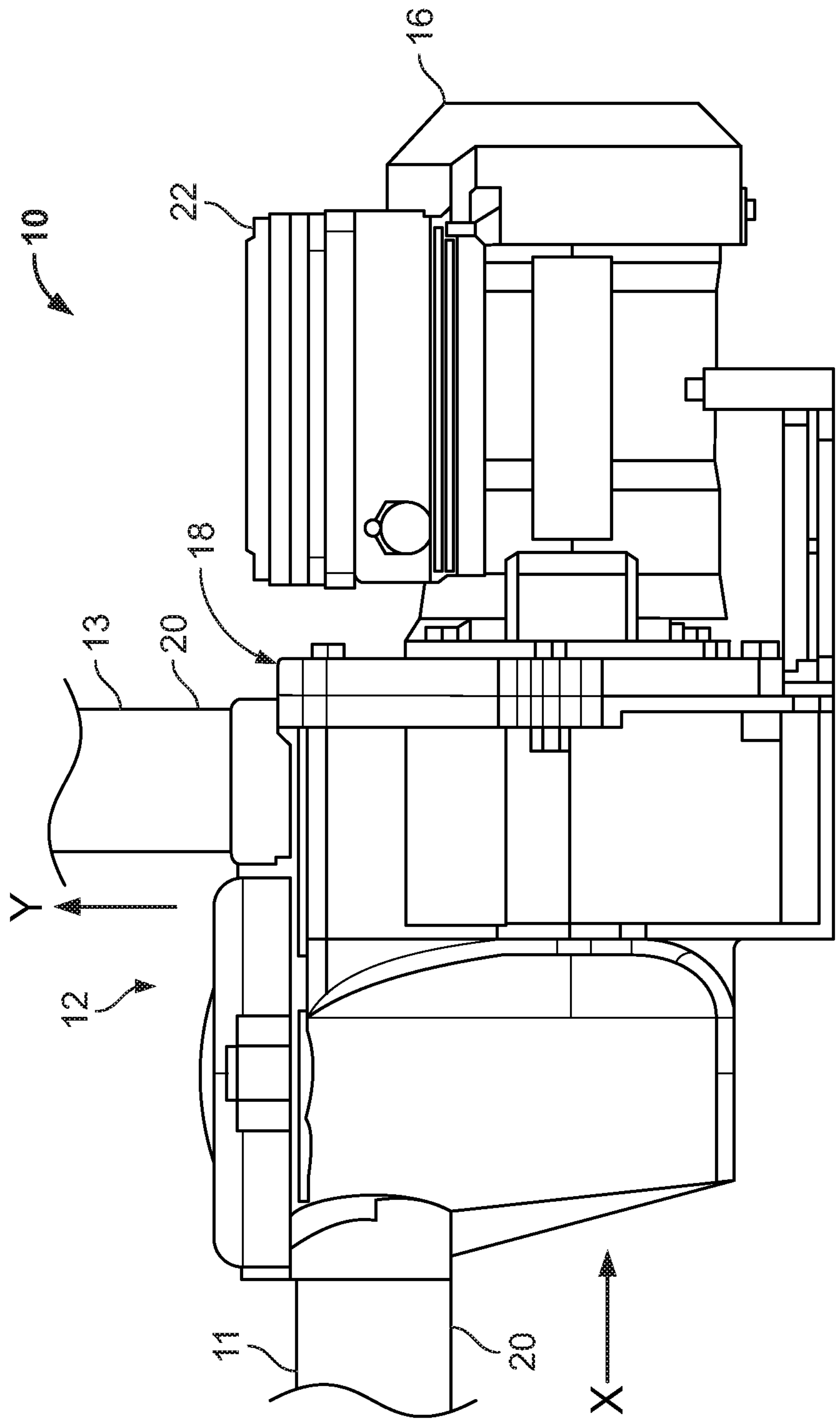
FIG. 1 is a side elevational view of an example pump system with which embodiments of the invention can be used.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

It should be noted that with respect to the thermal circuits diagrams contained herein, like circuit element labels relate to like physical structures, but not necessarily to identical physical structures or physical structures with equal thermal resistances or other thermal characteristics. For example, multiple resistances may be labeled as $R_{HS}$ because the resistances correspond to the same type of general structure—a heat sink—but not all resistances labeled $R_{HS}$ necessarily have equal thermal resistance values.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

As noted above, pump systems for pumping water for swimming pools or other fluid flow systems can benefit from a cooling system that transfers heat from one or more pump system components to the water being pumped by the pump system. Different pump systems, for example, can include a motor and a variety of electronics, which can be damaged or have a reduced operational life if exposed to overheating over time.

To address this need, or others, embodiments of the invention may include a cooling system in which one or more heat pipes are configured to transfer heat from one or more pump system components, such as a motor and electronics, to at least one heat sink. The heat pipe(s) and heat sink(s) of the cooling system can be arranged to provide a thermal pathway that transfers heat from the motor/drive components to a water flow driven by the pump. In this way, heat can be transferred to the water flow during pump operation.

Although some examples below focus expressly on liquid cooling via heat pipes, other cooling modes can be included in some embodiments. For example, in some embodiments, cooling systems according to the invention can include a convection fan in addition to the heat pipe/heat sink arrangement.

FIG. 1 illustrates an example pump system 10 that can be cooled with a cooling system as provided by this disclosure. As illustrated, a pump 12 of the pump system 10 includes a fluid inlet 11 and a fluid outlet 13, with arrows X and Y generally showing the direction of fluid flow through the pump 12. The pump system 10 also includes a motor 16 and an end plate 18 that is positioned between the motor 16 and the wet portion of the pump 12, including fluid piping 20. An electronic drive 22 is disposed above the motor 16, and can be configured according to known principles to control operation of the motor 16.

The pump system 10, including the motor 16 and the drive 22 can generate a substantial amount of heat, which may need to be rejected to a cold sink in order to maintain optimal operation of the pump system 10. Accordingly, for example, a cooling system according to an embodiment of the invention can be situated between the motor 16 and either or both of the end plate 18 and the fluid outlet 13, according to examples discussed below. In this way, for example, the cooling system can provide a thermal pathway from the motor 16, the drive 22, and other relevant components, to the fluid flowing through the pump system 10.

Figure 2:
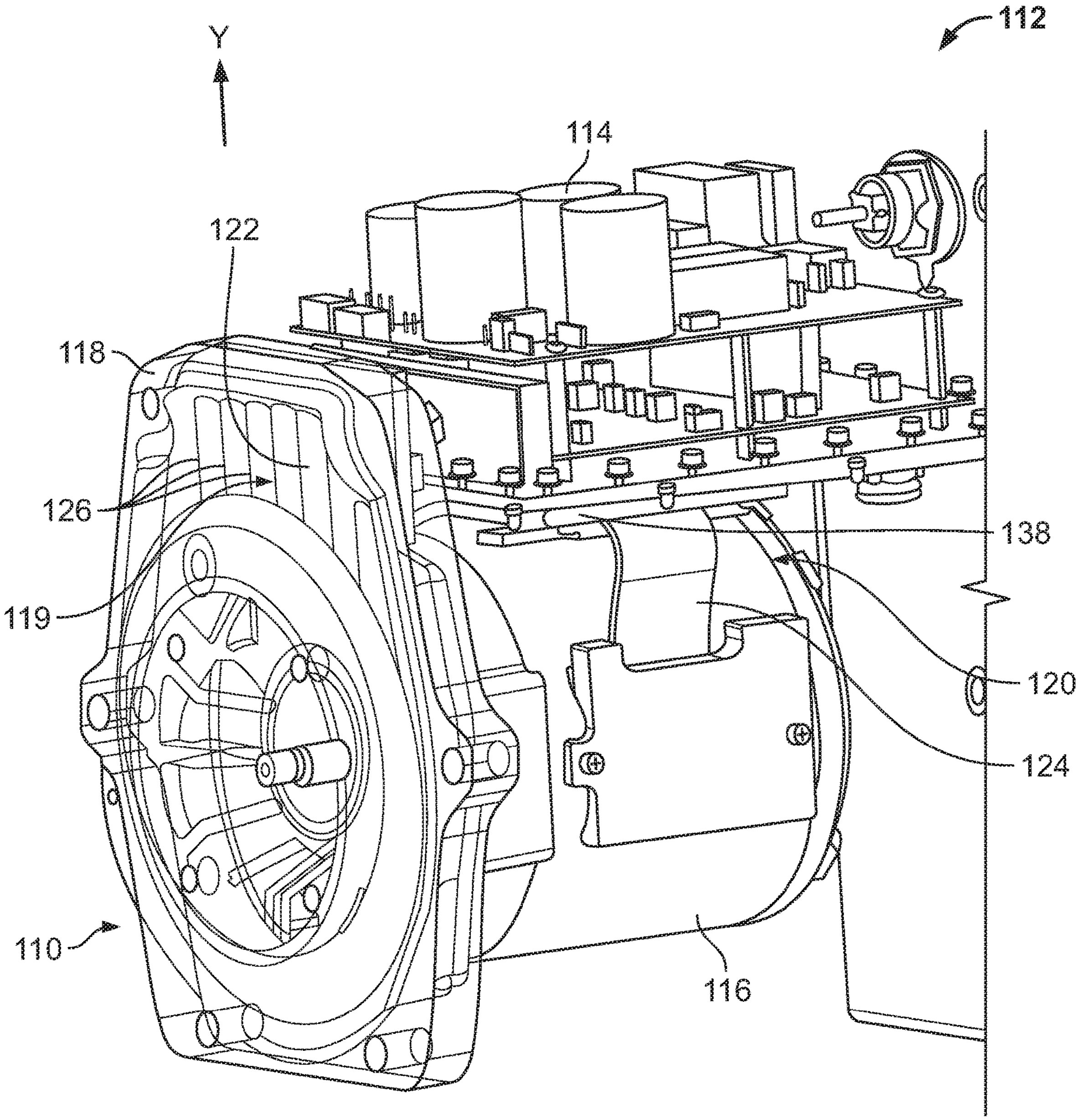
FIG. 2 is a partial isometric view of a pump system according to an embodiment of the invention with some parts rendered transparently for clarity.

Referring now to FIG. 2, in some embodiments of the invention, a pump system 112 can include a pump 110 (partially shown), a motor 116 to operate the pump 110, an electronics assembly 114 (e.g., a conventional motor drive including a bridge rectifier, MOSFETs, an inverter, one or more integrated circuits, and so on) to control the motor 116, and a cooling system 120. The cooling system 120 can include one or more heat sinks 122 and one or more heat pipes 124. As further discussed below, the heat pipes 124 can be configured to transfer heat from the motor 116 and the electronics assembly 114 to water being pumped by the pump 110, without necessarily exposing components of the motor 116 or the electronics assembly 114 to the pumped water.

Generally, some circulator pumps for circulating water have components that seal the motor stator from contact with the water. As shown in FIG. 2, for example, the pump 110 includes a substantially solid seal plate 118 which is interposed between the motor 116 and the water flow through pump 110, thereby providing a barrier between the motor stator (not shown) and the flow of water. The heat sink 122 is secured to the seal plate 118 and is designed to be exposed to the flow of water Y, while maintaining a fluid seal between the water and the motor 116. The one or more heat pipes 124, alone or in combination with other components, can provide a thermal connection between one or more of the motor 116 and/or the electronics assembly 114, so as to transfer heat from these components to the heat sink 122 and thereby cool the pump system 112 generally.

Heat pipes can be used in different combinations and configurations in different embodiments, and can be arranged to move heat to and from any variety of components. In the pump system 112, for example, at least one heat pipe 124 is connected to the motor 116. The heat pipe(s) 124 can, for example, directly receive heat from a pole or poles of the motor stator (e.g., as shown). In some embodiments, at least one heat pipe can be connected to the electronics assembly 114 for a similar purpose.

In some embodiments, other bodies can be arranged to transfer heat between sets of different heat pipes, or to transfer heat between the heat pipes and other objects. As shown in FIG. 2, for example, an intermediate heat transfer plate 138 (or other thermal body) can be arranged as part of a thermal circuit between the heat pipe(s) 124 and the heat sink(s) 122. In particular, for example, the heat transfer plate 138 can receive heat from a first set of the heat pipes 124 that lead from the motor 116 or the electronics assembly 114, and can reject heat to a second set of heat pipes 124 (not shown in FIG. 2) that lead to the heat sink 122. In some embodiments, an intermediate heat transfer plate can also provide direct structural support for certain components, such as the electronics assembly 114. In some embodiments, including as shown in FIG. 2, a heat transfer plate (e.g., the plate 138) can receive heat directly from certain components, such as a top pole of the stator of the motor 116, rather than receiving heat from those components via one or more of the heat pipes 124.

Generally, one or more of the heat pipes 124 can be a closed loop natural convection cooling device that consists of a sealed envelope, a wick (in some cases), and a working fluid. The sealed envelope can be a sealed tube made of a thermal conductor such as copper, aluminum, stainless steel, or a superalloy with an alkali metal, among others. The sealed envelope is compatible with the working fluid, the working fluid being water, a refrigerant, ammonia, acetone, ethanol, mercury, among others selected based on the operating temperature of the heat pipe application. Generally, as heat moves into one portion of the heat pipe, the working fluid can vaporize, resulting in general expansion and convection away from the source of heat. As the vaporized fluid reaches a cooler portion of the heat pipe, it will lose heat to the surroundings, via the walls of the heat pipe, condense, and then begin to circulate back to the heat source. In this way, for example, relatively high levels of heat transfer can be achieved.

Heat pipes in embodiments of the invention can exhibit any variety of geometries, materials, fluids, heat capacities, and so on. For example, the heat pipes 124 are illustrated as generally thin, rectangular, bendable bodies, with generally uniform cross-sections. This may be particularly suitable, for example, for cooling of pump systems that exhibit relatively close clearances as well as relatively high rates of heat generation. In other embodiments, however, other configurations are possible.

Generally, a heat sink can be disposed in a number of locations on a pump system to transfer heat out of pump system and into the flow of water. In some embodiments, a heat sink can be configured to be at least partly immersed in the water during operation of the pump. In some embodiments, fins or other structures can be disposed at least partly between the heat sink and the pump-driven water flow. As in the embodiment of FIG. 2, for example, a plurality of fins 126 can be formed into the seal plate 118 at a window 119 for the heat sink. This may be useful, for example, to enhance heat transfer from the heat sink 122 to the water, such as by appropriate guiding or conditioning flow of the water past the heat sink 122. The heat sink 122 can be placed over the fins 126 on the seal plate 118 to seal the flow of water, while also providing direct heat transfer from the heat sink 122 to the water.

Figure 3A:
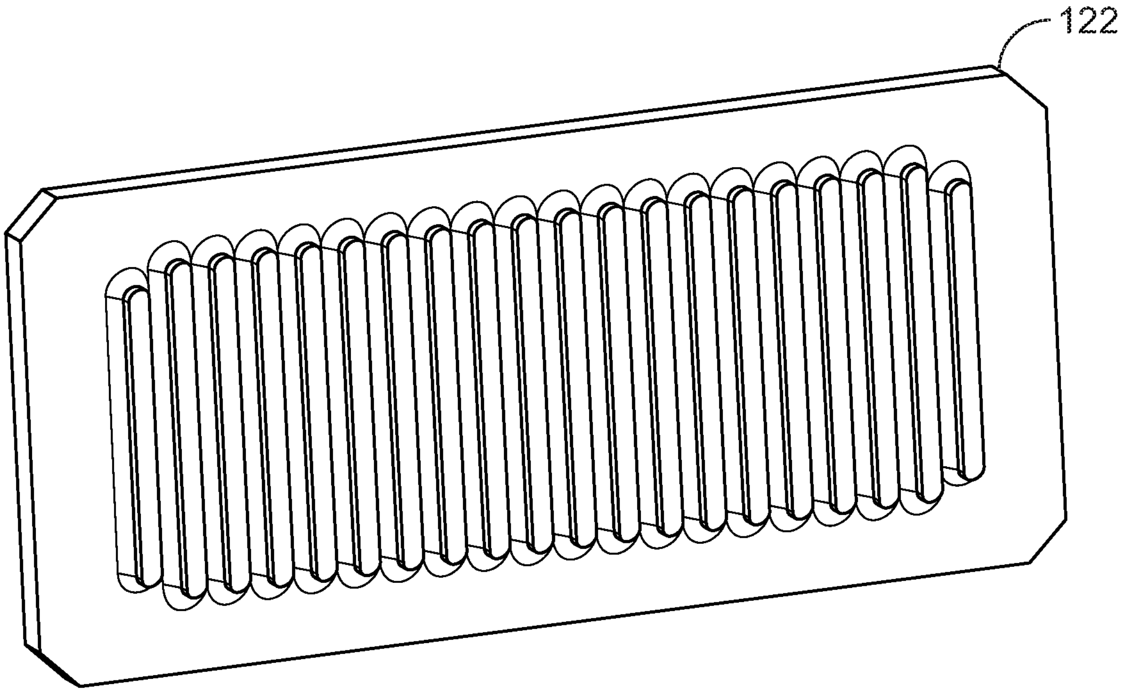
FIGS. 3A and 3B illustrate heat sinks of a pump system according to embodiments of the invention that may be used with the pump system of FIGS. 1 and 2.
Figure 3B:
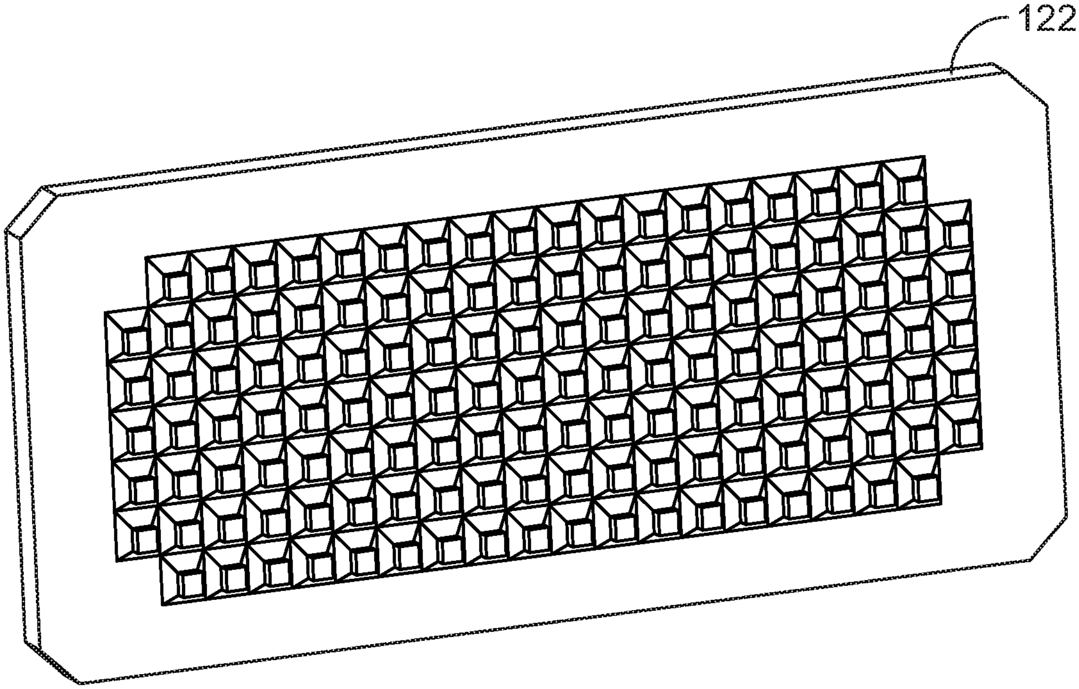

In different embodiments, a heat sink can be formed with different shapes, surfaces, or other characteristics. For example, the surface area of the heat sink 122 that is exposed to the water flow can be increased via optimized sizing of the heat sink 122 or via particular surface geometry, such as protrusions in the fins, post or other geometries, as shown in FIGS. 3A and 3B. The heat sink 122, and heat sinks in other embodiments, may be manufactured in a variety of known ways, including from any number of thermally conductive materials such as silicon carbide, aluminum, glass-filled polypropylene, or thermally conductive plastic, such as polyphenylene sulfide, or nylon.

In some embodiments, a heat sink can be usefully arranged downstream of an impeller, such as may increase the convective coefficient for water flowing across the heat sink. In some embodiments, as illustrated in FIG. 2 for example, a heat sink can be arranged on a seal plate of a motor. In some embodiments, a heat sink can be arranged on an outlet pipe of a pump system.

Some embodiments can include multiple heat sinks to receive heat from one or more heat pipes for rejection to pump water. In such cases, a number of combinations of heat sink arrangements can be provided. For example, one or more heat sinks can be mounted on a seal plate of the pump and one or more heat sinks can be mounted on an outlet pipe of the pump system. In further examples, two or more heat sinks can be mounted on the outlet pipe of the pump system, or two or more heat sinks can be mounted on the seal plate of the pump.

Figure 4A:
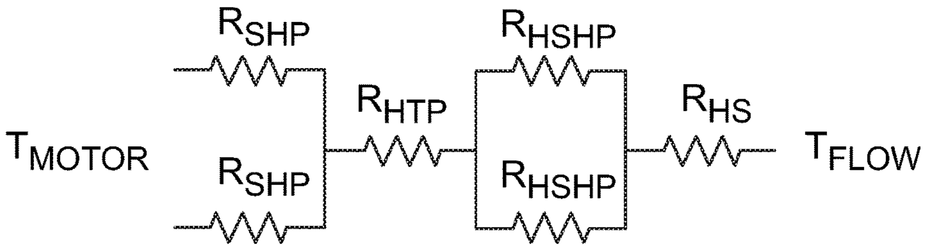
FIG. 4A is a thermal circuit diagram of a cooling system according to an embodiment of the invention.
Figure 4B:
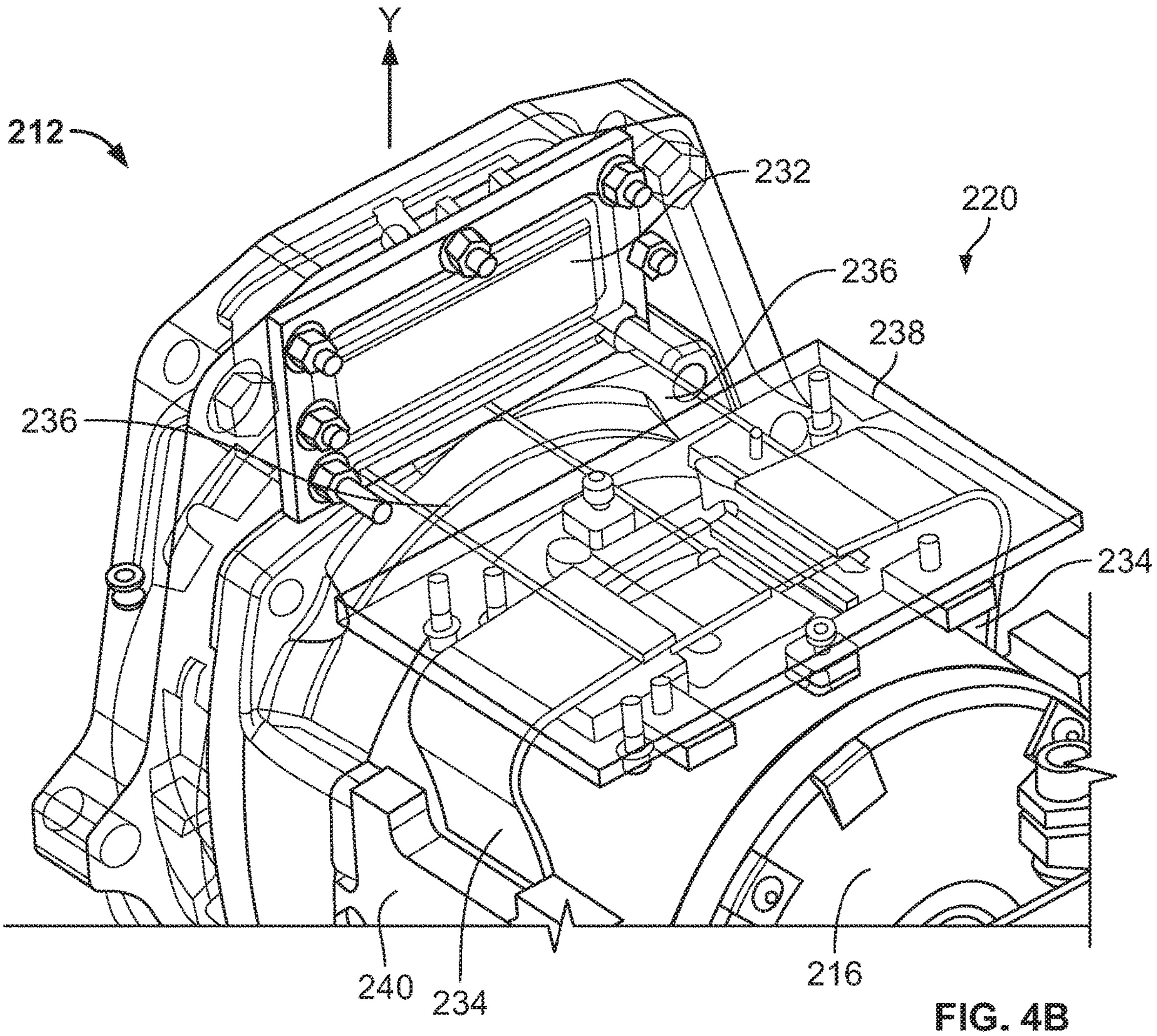
FIG. 4B is a partial isometric view of a portion of a pump system with a cooling system corresponding to the thermal circuit diagram of FIG. 4A according to an embodiment of the invention.
Figure 5A:
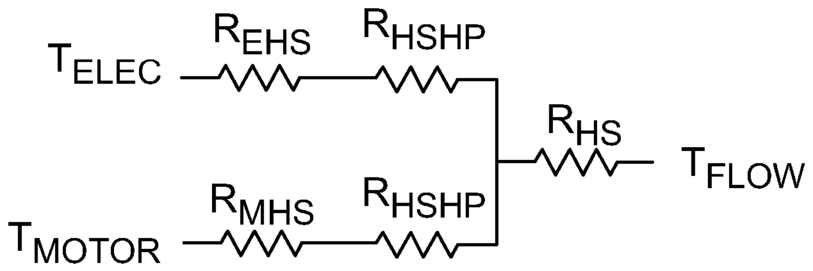
FIG. 5A is a thermal circuit diagram of a cooling system according to an embodiment of the invention.
Figure 5B:
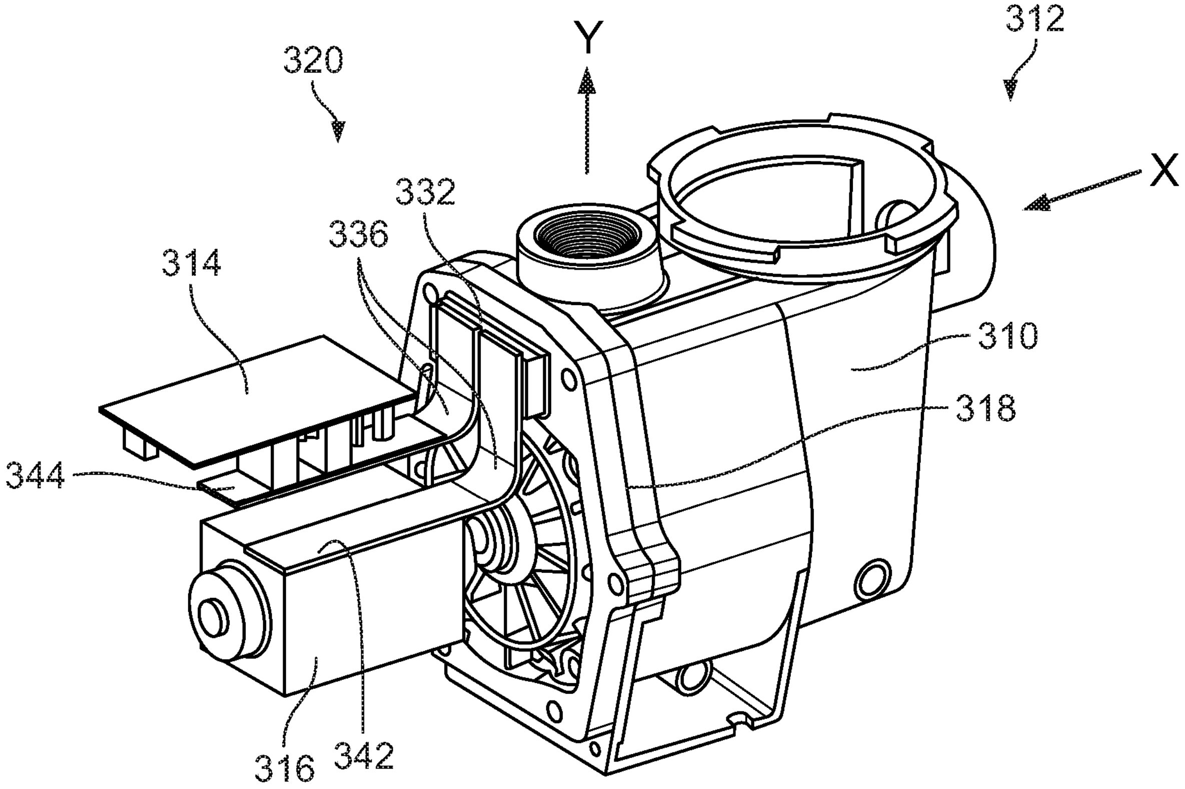
FIG. 5B is an isometric view of a pump system with a cooling system corresponding to the thermal circuit diagram of FIG. 5A according to an embodiment of the invention, with various parts of the pump system omitted for clarity.
Figure 6A:
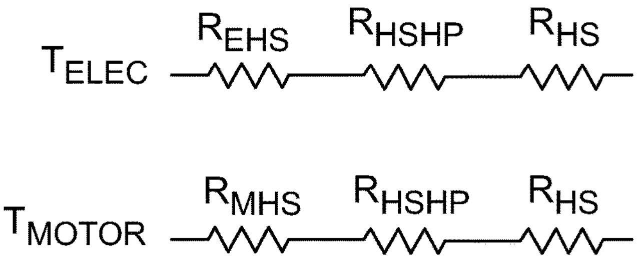
FIG. 6A is a thermal circuit diagram of a cooling system according to an embodiment of the invention.
Figure 6B:
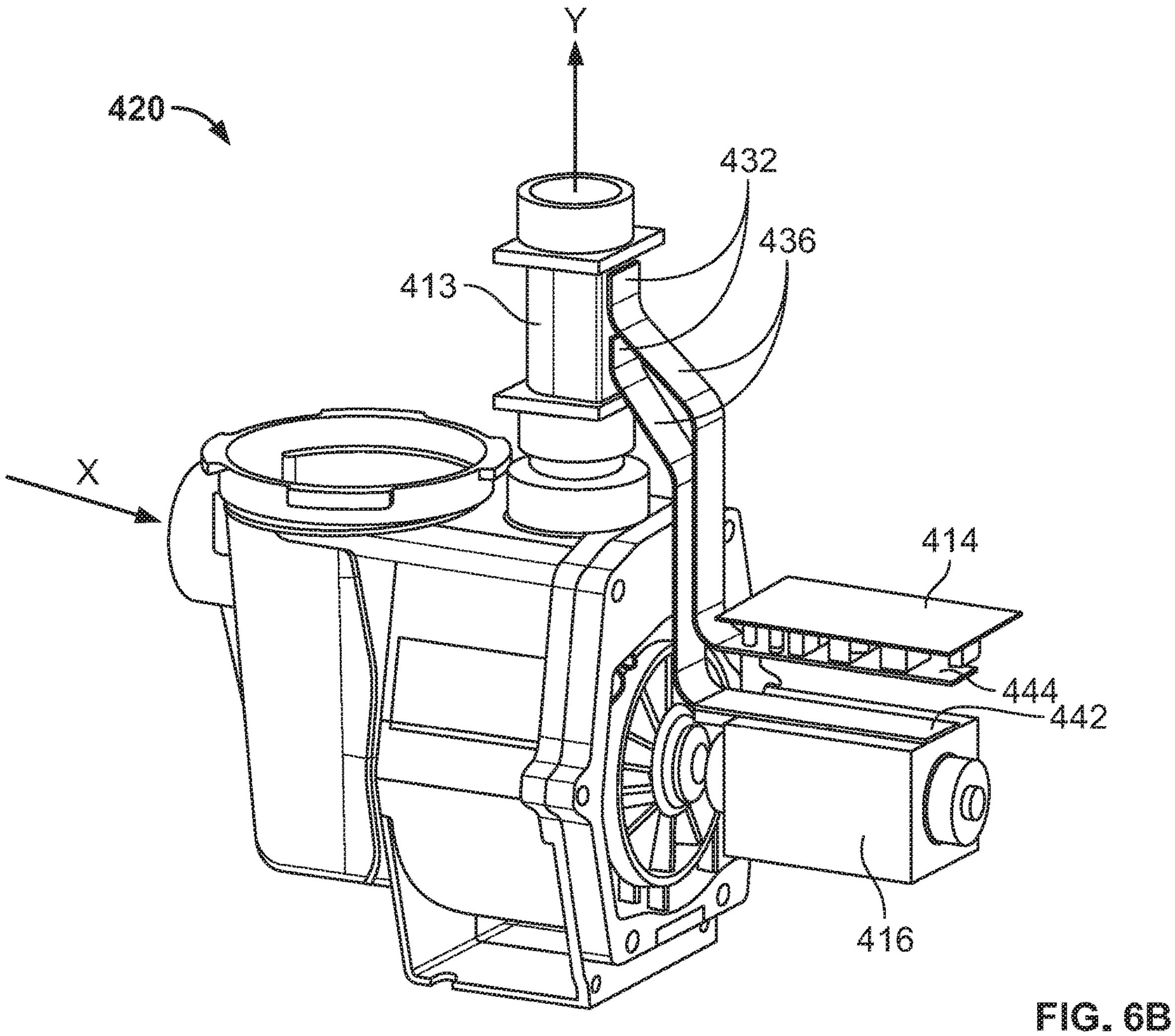
FIG. 6B is an isometric view of a pump system with a cooling system corresponding to the thermal circuit diagram of FIG. 6A according to an embodiment of the invention, with various parts of the pump system omitted for clarity.

In the embodiment illustrated in FIG. 2, the heat sink 122 is mounted to the seal plate 118 so that water passes the heat sink 122 before flowing out of the pump 110, and similar arrangements are illustrated in FIGS. 4B and 5B. In some embodiments, such as illustrated in FIG. 6B, a heat sink can be mounted to an exit pipe, or other part of a pump system, so that water passes the heat sink after flowing out of the pump.

As noted above, a cooling system for a pump system can include a variety of heat pathway arrangements formed from one or more heat sinks, and one or more heat pipes to transfer heat from a pump motor or an electronics assembly to the flow of water. In this regard, for example, heat pipes, heat sinks, and other components of a cooling system can be arranged in a variety of combinations, with the various components in parallel, in series, and any combination of a parallel or series arrangement, to effect appropriate heat transfer (e.g., as described above).

FIG. 4A illustrates aspects of a thermal circuit of a cooling system 220 that includes two stator heat pipes 234 ($R_{SHP}$) arranged in parallel, and an intermediate heat transfer plate 238 ($R_{HTP}$) arranged in series with the stator heat pipes 234 and also with heat-sink heat pipes 236 ($R_{HSHP}$). The heat-sink heat pipes 236 are arranged in parallel with each other, and in series with a heat sink 232 ($R_{HS}$). $T_{MOTOR}$ represents the temperature of the motor 216 and $T_{FLOW}$ represents the temperature of the water flowing past the heat sink 232. Accordingly, heat from the motor 216 (or other components) can flow via the stator heat pipes 234 to the intermediate heat transfer plate 238, then via the heat-sink heat pipes 236 and the heat sink 232 to the pumped water flow.

A representative physical embodiment of the thermal circuit of FIG. 4A is illustrated in FIG. 4B. In the embodiment illustrated, the stator heat pipes 234 are secured to (e.g., directly in contact with) opposing poles of the stator of the motor 216, with a clamp plate 240. In the illustrated embodiment, openings in the housing of the motor 216 at one or more poles of the stator (or elsewhere) can allow direct contact between the stator heat pipes 234 and the stator, although other configurations are possible. For example, as also alluded to above, in some embodiments, the intermediate heat transfer plate 238 can additionally or alternatively secure a heat pipe to a component to be cooled (e.g., a stator pole) or can receive heat directly from such a component.

Thus, the stator heat pipes 234, and the heat transfer plate 238, can be arranged to conductively receive heat from one or more poles of the stator of the motor 216. Further, the heat-sink heat pipes 236 are secured in parallel with each other between the heat transfer plate 238 and the heat sink 232. Also, the heat sink 232 is exposed to the flow of water Y through the pump system 212. Thus, a thermal pathway from multiple poles of the stator of the motor 216 to the flow of water is provided. Further, due to the generally L-shaped and partly vertical orientation of the heat pipes 234, 236, a particularly effective natural circulation can be established within the heat pipes 234, 236.

In some embodiments, other structures can be provided. For example, the heat-sink heat pipes 236 can be sandwiched between the intermediate heat transfer plate 238 and a support plate, such as an L-bend aluminum construct that can support motor electronics (not shown in FIG. 4B). In some embodiments, the motor electronics can be mounted directly to or otherwise supported by the intermediate heat transfer plate 238. In some embodiments, additional heat pipes (not shown) can be provided to move heat from motor electronics to the heat transfer plate 238, to the heat sink 232, or to various other components.

In some embodiments, as also noted above, the heat pipes can be used to move heat in parallel from a motor and from motor electronics. For example, in the embodiment illustrated in FIGS. 5A and 5B, a cooling system 320 includes a motor heat sink 342 ($R_{MHS}$), an electronics assembly heat sink 344 ($R_{EHS}$), a heat sink heat pipe 336 ($R_{HSHP}$) for each of the heat sinks 342, 344, and a heat sink 332 ($R_{HS}$). In FIG. 5*a*, in this regard, $T_{MOTOR}$ represents the temperature of the motor 316, $T_{FLOW}$ represents the temperature of the water flowing past the heat sink 332, and $T_{ELEC}$ represents the temperature of an electronics assembly 314.

As illustrated in FIG. 5B, in particular, the motor heat sink 342 and the electronics assembly heat sink 344 are arranged in parallel, with respective dedicated thermally connected heat sink heat pipes 336 arranged in parallel and thermally connected to the heat sink 332. Further, the heat sink 332 is exposed to the outlet flow Y of water through pump system 312. Accordingly, the cooling system 320 and other similarly arranged embodiments can provide highly effective cooling of the motor and the motor electronics, without excessive heat in either of the motor or the motor electronics substantially adversely affecting the rate of heat transfer from the other. In the illustrated embodiment, the heat sink 332 is arranged downstream from an impeller of a pump 310 and on a seal plate 318 of the pump 310, similarly to the heat sinks 122, 232 described above. In other embodiments, however, other arrangements are possible.

In some embodiments, a cooling system can include two parallel heat transfer pathways, with dedicated cooling for separate components of a motor assembly. For example, as shown in the thermal circuit in FIG. 6A and the physical embodiment shown in FIG. 6B, the cooling system 420 includes separate dedicated pathways to a fluid outlet 413 for cooling an electronics assembly 414 and for cooling a motor 416. In this regard, for example, one pathway includes an electronics assembly heat sink 444 ($R_{EHS}$), a heat-sink heat pipe 436 ($R_{HSHP}$), and an outlet heat sink 432 ($R_{HS}$). The other, parallel thermal pathway includes a motor heat sink 442 ($R_{MHS}$), a heat-sink heat pipe 436 ($R_{HSHP}$), and an outlet heat sink 432 ($R_{HS}$). Both thermal pathways transfer heat to a corresponding flow of water, such as via exposure of the heat sink 432 to water flowing through the fluid outlet 413.

In other embodiments, other configurations are possible. For example, each of the heat pipes 436 can be placed in communication with a respective dedicated heat sink, for dedicated rejection of heat to the water flow Y. In some embodiments, one or both of the heat pipes 436 can be configured to transfer heat to the water flow Y at a seal plate of a pump system (or elsewhere), rather than at the fluid outlet 413.

Figure 7A:
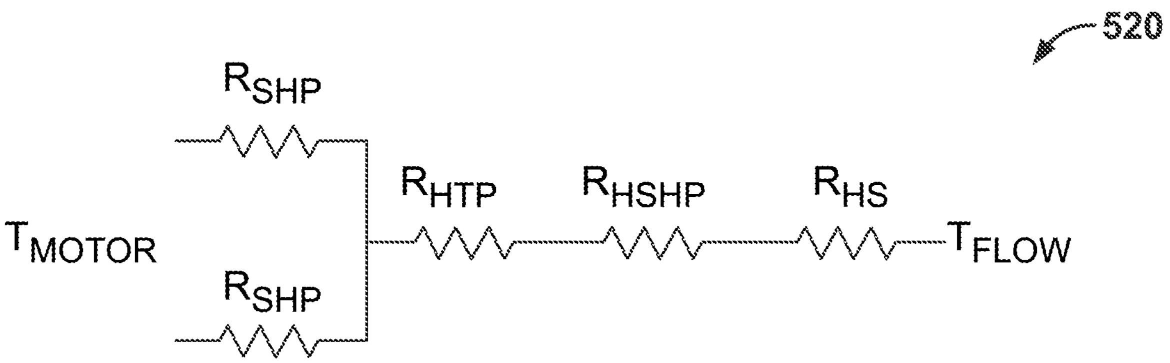
FIGS. 7A through 7C illustrate thermal circuit diagrams of cooling systems according to embodiments of the invention.
Figure 7B:
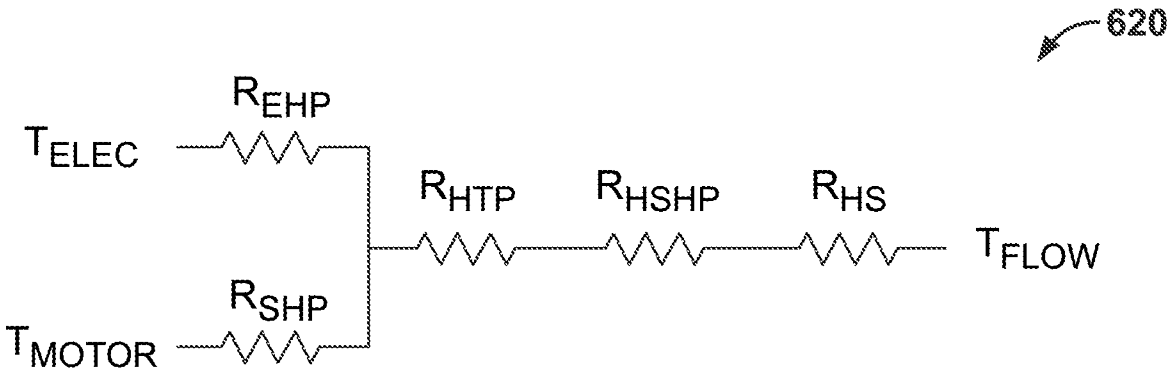
Figure 7C:
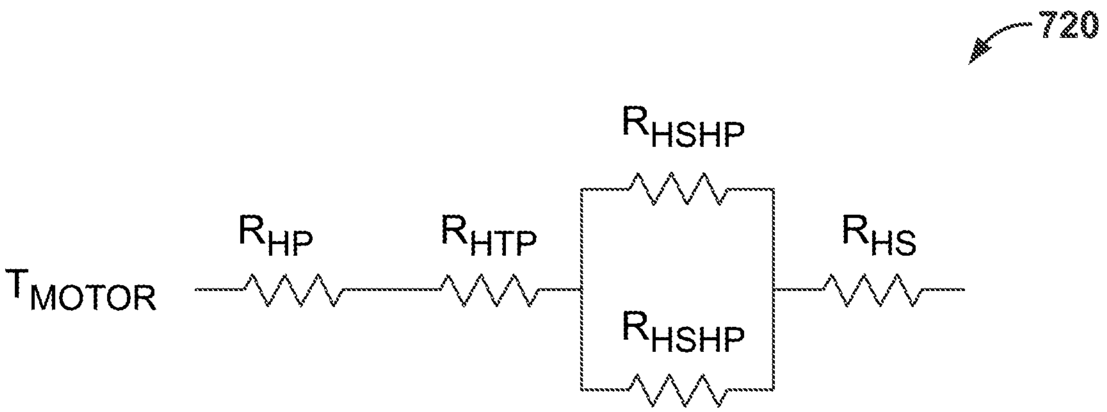

FIGS. 7A through 7C show additional potential thermal circuits for cooling motor assemblies, representative of other embodiments of the invention. The thermal circuit of the cooling system 520 illustrated in FIG. 7A includes two parallel heat pipes ($R_{SHP}$) connected with a motor ($T_{MOTOR}$), and in series with an intermediate heat transfer plate ($R_{HTP}$), a heat-sink heat pipe ($R_{HSHP}$) and a heat sink ($R_{HS}$). FIG. 7B illustrates a cooling system 620 in which an electronics assembly ($T_{ELEC}$) and a motor are each in thermal communication with (e.g., attached to) one of two or more parallel heat pipes ($R_{EHP}$ and $R_{SHP}$ respectively), with subsequent heat flow similar to the arrangement in FIG. 7A. The thermal circuit of a cooling system 720 illustrated in FIG. 7C includes a heat pipe ($R_{HP}$) connected in series with an intermediate heat transfer plate ($R_{HTP}$), and further connected in series with two parallel heat-sink heat pipes ($R_{HSHP}$) that are connected in series with heat sink ($R_{HS}$).

In other embodiments, other configurations are possible. For example, those of skill in the art will recognize, according to the principles and concepts disclosed herein, that various combinations, sub-combinations, and substitutions of the components discussed above can provide appropriate cooling for a variety of different configurations of motors, pumps, electronic assemblies, and so on, under a variety of operating conditions.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A pump system for pumping water for pools or other flow systems, the pump system comprising:

a pump including a seal plate;

a motor configured to operate the pump;

an electronic drive assembly configured to control the motor; and a cooling system that includes:

a heat sink in thermal communication with the water and arranged downstream of an impeller of the pump, wherein the heat sink is mounted on the seal plate of the pump; and a heat-pipe arrangement designed to transfer heat to the heat sink, the heat-pipe arrangement including at least one heat pipe designed to receive heat via thermal conduction from the electronic drive assembly.

2. The pump system of claim 1, wherein the heat sink is configured to be at least partly immersed in the water during operation of the pump.

3. The pump system of claim 1, wherein the heat-pipe arrangement includes a parallel arrangement of multiple heat pipes configured for parallel transfer of heat from the electronic drive assembly and the motor.

4. The pump system of claim 1, wherein the heat-pipe arrangement includes a series arrangement of multiple heat pipes configured for series transfer of heat from the electronic drive assembly and the motor.

5. The pump system of claim 1, wherein the heat-pipe arrangement includes at least a first heat pipe in parallel with a second heat pipe, and a third heat pipe in series with the first and second heat pipes.

6. The pump system of claim 1, wherein the heat-pipe arrangement further includes an intermediate heat transfer plate; and wherein the heat-pipe arrangement further includes:

a first heat pipe configured to transfer heat to the intermediate heat transfer plate from the at least one of the motor or the electronic drive assembly; and a second heat pipe configured to transfer heat from the intermediate heat transfer plate to the heat sink.

7. The pump system of claim 6, wherein the electronic drive assembly is secured to the motor via the intermediate heat transfer plate.

8. The pump system of claim 6, wherein the first heat pipe is configured to transfer heat from the motor to the intermediate heat transfer plate; and wherein the heat-pipe arrangement further includes a third heat pipe configured to transfer heat from the electronic drive assembly to the intermediate heat transfer plate.

9. The pump system of claim 6, wherein the intermediate heat transfer plate is arranged to directly receive heat conductively from a pole of a stator of the motor.

10. The pump system of claim 6, wherein the first heat pipe is secured with a clamp plate to a pole of a stator of the motor.

11. The pump system of claim 1, wherein the seal plate has a plurality of fins that are arranged to guide water over the heat sink.

12. The pump system of claim 11, wherein the heat sink comprises a plate with a plurality of protrusions extending from a surface of the plate, the plurality of protrusions configured to interface with the plurality of fins.

13. The pump system of claim 1, wherein the seal plate has a window configured to receive the heat sink.

14. A cooling system for a pump system that is configured to pump water for pools or other flow systems, the pump system including a pump, a motor configured to operate the pump, a seal plate of the pump configured to provide a barrier between the motor and water flowing through the pump, and an electronic drive assembly configured to control the motor, the cooling system comprising:

a heat sink mounted on the seal plate, wherein the heat sink is in thermal communication with the water and arranged downstream of an impeller of the pump; and a heat-pipe arrangement designed to transfer heat to the heat sink, the heat-pipe arrangement including:

at least one heat pipe designed to receive heat via thermal conduction from the electronic drive assembly; and at least one heat pipe designed to receive heat from the motor.

15. The cooling system of claim 14, wherein the heat sink is configured to be exposed to water flowing through the pump during operation of the pump.

16. The cooling system of claim 15, wherein the heat sink is arranged in a window of the seal plate of the pump.

17. The cooling system of claim 14, wherein the heat-pipe arrangement includes:

a parallel arrangement of multiple heat pipes configured for parallel transfer of heat from the electronic drive assembly and the motor.

18. The cooling system of claim 14, wherein the heat-pipe arrangement further includes:

an intermediate heat transfer plate;

a first heat pipe configured to transfer heat to the intermediate heat transfer plate from the at least one of the motor or the electronic drive assembly; and a second heat pipe configured to transfer heat from the intermediate heat transfer plate to the heat sink.

19. The cooling system of claim 18, wherein the intermediate heat transfer plate is arranged to directly receive heat conductively from a first pole of a stator of the motor; and wherein the heat-pipe arrangement is configured to transfer heat to the intermediate heat transfer plate from one or more of a second pole of the stator or a third pole of the stator.

20. The cooling system of claim 14, wherein the heat sink comprises a plate with a plurality of posts that protrude from a surface of the plate.

* * * * *